United States Patent
Wurm

(10) Patent No.: US 7,870,685 B2
(45) Date of Patent: Jan. 18, 2011

(54) METHOD FOR THE TREATMENT OF COVERING MATERIALS FOR INTERIOR FITTING PIECES IN PARTICULAR FOR VEHICLE INTERIORS AND INTERIOR FITTING PIECES

(75) Inventor: Henry Wurm, Roeschwoog (FR)

(73) Assignee: Johnson Controls GmbH, Burscheid (DE)

( * ) Notice: Subject to any disclaimer, the term of this patent is extended or adjusted under 35 U.S.C. 154(b) by 1807 days.

(21) Appl. No.: 10/517,129

(22) PCT Filed: May 30, 2003

(86) PCT No.: PCT/EP03/05689

§ 371 (c)(1),
(2), (4) Date: Dec. 6, 2004

(87) PCT Pub. No.: WO03/103457

PCT Pub. Date: Dec. 18, 2003

(65) Prior Publication Data

US 2005/0198874 A1    Sep. 15, 2005

(30) Foreign Application Priority Data

Jun. 5, 2002  (DE) .................. 102 25 084

(51) Int. Cl.
*D06F 73/02* (2006.01)
*F26B 25/06* (2006.01)
*D06F 87/00* (2006.01)

(52) U.S. Cl. .................. 38/3; 38/7; 38/1 A; 38/14; 34/218; 68/5 C

(58) Field of Classification Search .................. 38/7, 38/14, 1 A, 44, 1 C, 1 D, 2–4; 34/218; 68/5 C; 223/51, 53, 70
See application file for complete search history.

(56) References Cited

U.S. PATENT DOCUMENTS

| | | | | |
|---|---|---|---|---|
| 3,739,487 A | * | 6/1973 | Clark | 34/77 |
| 3,765,580 A | * | 10/1973 | Wilsker et al. | 223/52 |
| 3,861,179 A | * | 1/1975 | Orchard | 68/6 |
| 3,899,108 A | * | 8/1975 | Frauendorf | 223/51 |
| 4,823,488 A | * | 4/1989 | Fottner | 38/14 |
| 4,947,026 A | * | 8/1990 | Groom et al. | 219/401 |
| 5,305,484 A | * | 4/1994 | Fitzpatrick et al. | 8/149.3 |
| 5,815,961 A | * | 10/1998 | Estes et al. | 38/14 |
| 6,405,461 B1 | | 6/2002 | Groel et al. | |
| 6,784,673 B2 | * | 8/2004 | Tomasi et al. | 324/664 |
| 6,889,453 B2 | * | 5/2005 | Maziere et al. | 38/44 |

(Continued)

FOREIGN PATENT DOCUMENTS

DE   31 19 560 A1   12/1982

(Continued)

*Primary Examiner*—Ismael Izaguirre
(74) *Attorney, Agent, or Firm*—Foley & Lardner LLP

(57) ABSTRACT

A method for the treatment of covering materials for use with a vehicle component, in particular for pieces of trim or vehicle seats, whereby the moisture content of the covering material is temporarily increased, such that the covering material is softened in a treatment chamber by the introduction of moisture and then smoothed by the action of a drawing force extending the covering material is disclosed. A vehicle component treated by the above method, in particular seats, roof linings, and trim pieces for motor vehicles is further disclosed.

28 Claims, 1 Drawing Sheet

U.S. PATENT DOCUMENTS 7,404,264 B2 * 7/2008 Heinz et al. .................. 38/7

FOREIGN PATENT DOCUMENTS

| DE | 36 27 940 A1 | 3/1988 |
| DE | 197 38 355 A1 | 3/1999 |
| DE | 101 28 662 A1 | 12/2002 |
| EP | 0 573 726 A1 | 12/1993 |
| JP | 59-28992 A | 2/1984 |
| JP | 59-32492 A | 2/1984 |
| JP | 11042400 A | 2/1999 |
| JP | 2000303341 A | 10/2000 |

* cited by examiner

METHOD FOR THE TREATMENT OF COVERING MATERIALS FOR INTERIOR FITTING PIECES IN PARTICULAR FOR VEHICLE INTERIORS AND INTERIOR FITTING PIECES

CROSS-REFERENCE TO RELATED PATENT APPLICATIONS

The present Application claims the benefit of priority to the following international Applications: PCT Patent Application No. PCT/EP03/05689 titled "Method for the Treatment of Covering Materials for Interior Fitting Pieces in Particular for Vehicle Interiors and Interior Fitting Pieces" filed on May 30, 2003 which published under PCT Article 21(2) on Dec. 18, 2003 as WO 03/1034574 A2 in the German language and German Patent Application No. 102 25 084.7 filed on Jun. 5, 2002 (which are hereby incorporated herein by reference in their entirety).

FIELD

The invention relates generally to a method for the treatment of covering materials of vehicle interior fitting pieces; and in particular, to a method for the treatment of covering materials suitable for use with pieces of trim or seats of a motor vehicle, in which the moisture content of the covering material is temporarily increased. The invention further relates to a vehicle interior fitting piece treated by this method.

BACKGROUND

A method of the generic type is generally known in practice. For example, it is known to subject a vehicle seat to a manual treatment with steam after assembly of the metal structures, the upholstering thereof and the covering of the upholstery with a covering material (for example woven fabric, knitted fabric or leather). For this purpose, a nozzle which is connected via a flexible tube to a mobile steam generator is placed onto those regions of the seat cover at which folds or creases have formed as they were being covered. Under the action of the steam and a mechanical treatment (ironing) optionally taking place at the same time, the seat cover is smoothed. The seat is subsequently ready for installation in the motor vehicle.

This generally customary procedure requires intensive use of labor and is furthermore associated with the risk that, with the local, intensive action of the steam, undesirable changes occur locally to the appearance of the seat cover.

Accordingly, it would be desirable to provide a method capable of bringing about a uniform treatment of the seat cover with little outlay.

SUMMARY

According to one exemplary embodiment, a method of treating a cover material for use with an interior vehicle component includes the steps of placing a cover material into a treatment chamber for moistening, moistening the cover material in the treatment chamber to soften the cover material, and smoothing the cover material by providing a drawing force that extends the cover material.

According to a further embodiment, a method of treating a cover material for use with an interior vehicle component includes the steps of providing a cover material, identifying the cover material, selecting treatment parameters that are suitable for the treatment of the cover material, placing the cover material into a treatment chamber, and moistening the cover material in the treatment chamber.

According to a further embodiment, a method of treating a cover material for use with an interior vehicle component includes the steps of providing a cover material, placing a cover material into a treatment chamber for moistening, determining the contour of the cover material, establishing a predetermined distance between a steam nozzle and the cover material, and moistening the cover material in the treatment chamber.

According to a further embodiment, an interior fitting piece is treated by any of the above mentioned methods such as seats, roof linings, and trim pieces for motor vehicles.

DETAILED DESCRIPTION

Figure 1:
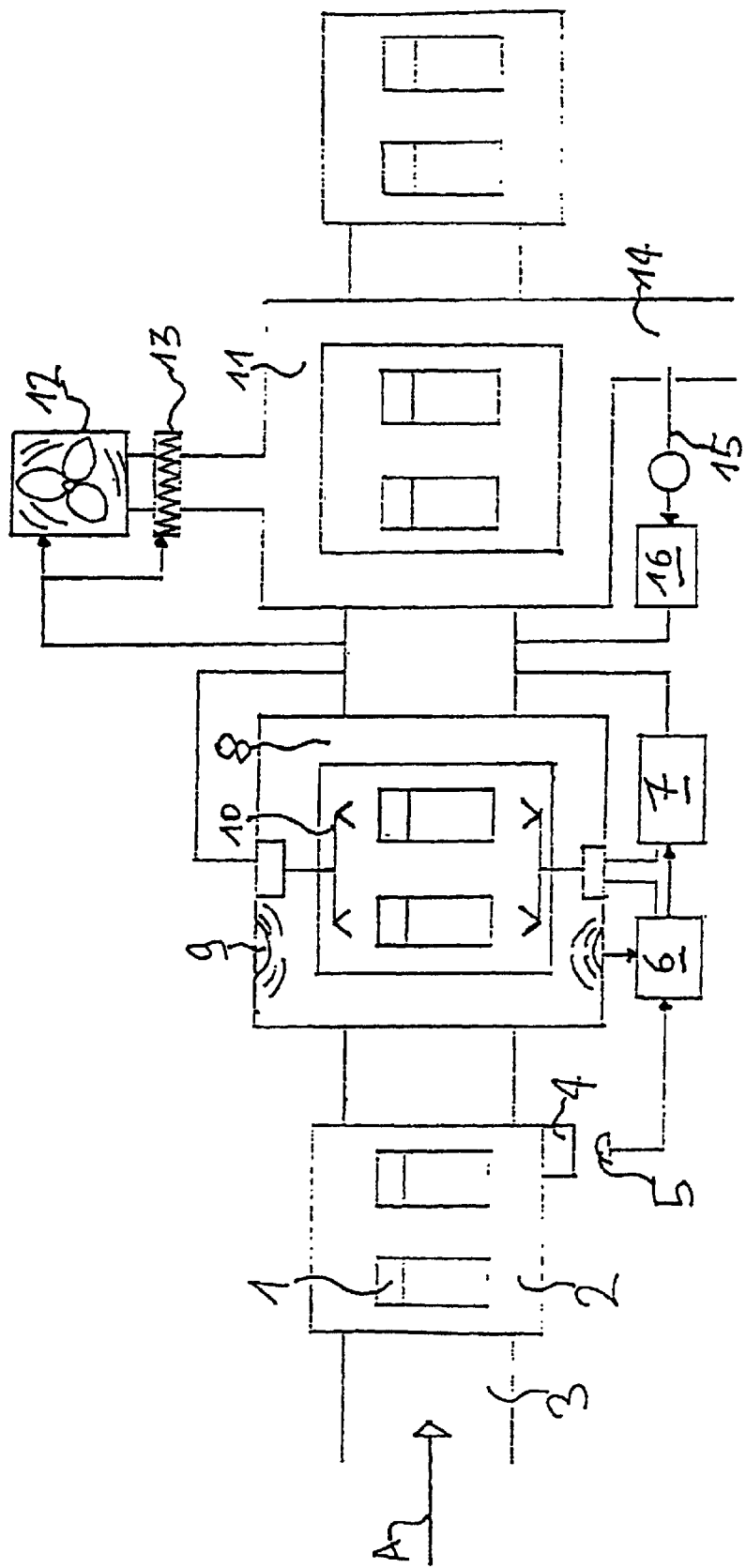
FIG. 1 is a schematic drawing illustrating a method of treating a cover material according to an exemplary embodiment.

With reference to the FIGURE, a method is provided for the treatment of a cover material (e.g., a seat cover, covering material, etc.). The method is shown and described as a method for the treatment of a cover material suitable for use with a vehicle component (e.g., vehicle seat, head restraint, arm rest, roof lining, dashboard, door and/or pillar trim, etc.); and in particular, to a method for the treatment of a cover material for use as a seat cover of a vehicle seat.

The method generally includes the steps of softening the fibers of the covering material in a treatment chamber 8 by the supply of moisture and smoothing the covering material by the action of a drawing force extending the covering material.

The moisture content of the covering material (e.g., the fibers of the covering material, etc.) after the moistening in treatment chamber 8 is between approximately 2 and 10% by weight, preferably approximately 5% by weight. In order to obtain an optimum treatment result, the moisture content of the covering material may be measured (e.g., directly or indirectly), and the moistening can be continued until a predetermined moisture content is reached.

The moistening in treatment chamber 8 advantageously takes place at an air temperature of between approximately 100 to 150° C., preferably between approximately 125 and 130° C.

According to a preferred embodiment, provision can be made for the surface temperature of the covering material (and/or an added-on accessory part) to be measured and for the air temperature and/or the treatment time to be set in such a manner that a permissible temperature load is not exceeded. The addition of moisture to treatment chamber 8 preferably takes place by the supply of steam, in particular water vapor. In this case, additives, in particular odorous substances, smoothing agents and/or stain-inhibiting addition agents can be added to the steam.

The drawing force provided to smooth the covering material may be produced by the depositing of the covering material onto an elastically compressible base, such as (for example) an elastically deformable foam material. The covering material can either be moistened in treatment chamber 8 after the covering material is deposited onto the elastically compressible base or alternatively can be moistened in treatment chamber 8 and only subsequently be deposited onto the base with elastic compression of the latter.

According to an exemplary embodiment, the method of treating the covering material further includes the step of drying the covering material. According to such an embodiment, the covering material is preferably dried after the moistening, in which case the moisture content of the covering material after the drying is to be between approximately 0 and 1.0% by weight, preferably between approximately 0.05 and 0.25% by weight.

In order to reduce the outlay on investment, provision may be made for the drying to take place in the same treatment chamber as the moistening (e.g., treatment chamber 8). However, depending on the number of components to be treated, it may be advantageous to carry out the drying in a second treatment chamber, shown as a second treatment chamber 11, following the treatment chamber for the moistening or to carry it out outside the treatment chamber. According to one particularly advantageous method, the moisture of the covering material is measured (directly or indirectly) and the covering material is dried until a predetermined residual moisture is reached.

In order to rationalize the treatment, a plurality of covering materials provided for moistening can be grouped, if appropriate connected to the entire interior fitting piece, on a transport auxiliary device such as (for example) a pallet, and can be supplied together to the treatment chamber.

According to an exemplary embodiment, the method of treating a covering material may provide for a largely automatic operation of the treatment device, in particular with the treatment product (e.g., the covering material) continuously changing. For example, the method may include the step of recognizing (e.g., identifying, etc.) the covering material to be treated in the treatment chamber (and/or an accessory part to be treated at the same time in the treatment chamber as a consequence of being connected (directly or indirectly) to said covering material). Once recognized, treatment parameters can be selected which are suitable for the treatment of the covering material, and/or an accessory part to be treated at the same time, (e.g., treatment parameters intended to avoid damaging, etc.). The method further includes the step of using the selected treatment parameters to treat the covering material, and/or an accessory part to be treated at the same time.

To provide for the recognition of the covering material (and/or an accessory part) to be treated, the covering material, the accessory part, and/or a transport auxiliary device (used if appropriate) may be provided with means for identifying the covering material and/or the accessory part. These identification means preferably permit automated recognition and comprise, for example, a bar code and/or a chip coding.

The method of treating a covering may further include the step of protecting regions of the covering material (and/or an accessory part) having differing resistance to heat and moisture. According one exemplary embodiment, the moisture- and/or temperature-sensitive regions of the covering material (and/or an accessory part) are covered during the treatment in the treatment chamber. According to another exemplary embodiment, provision may be made for moisture- and/or temperature-sensitive regions of the covering material (and/or an accessory part) to be protected during the treatment in the treatment chamber by localized reduction of the effect of treatment devices or to be brought into direct or indirect connection with said covering material only after treatment of the latter in the treatment chamber.

The method of treating a cover material may further include the step of determining the contour of the cover material. The steam which is preferably used for the supply of the moisture can be introduced into the treatment chamber via nozzles, for example. By determining the contour of the covering material to be treated, a predetermined distance between the nozzles supplying the steam and the covering material can be set, and the covering material can then be treated in the treatment chamber.

According to one exemplary embodiment, the determination of the contour takes place by mechanical scanning of the covering material. According to various alternative embodiments, the determination of the contour takes place without contact (e.g., using ultrasonic or laser sensors).

According to another exemplary embodiment, the method of treating a cover material may further include the step of subjecting the covering material to automatic mechanical processing, in particular by means of brushes or rollers.

FIG. 1 illustrates, by way of example and schematically, a method sequence according to a preferred embodiment using the example of treating vehicle seats.

Vehicle seats 1, which are already provided with a seat cover (e.g., cover material, etc.) and can be seen in top view, are grouped and orientated, prior to the treatment, on a transport auxiliary device in the form of a pallet 2 which can be moved through the manufacturing hall in the direction of the arrow A by means of a transport device 3. An identifier, shown as a programmable chip 4, in which information items about the particular product being transported are stored (e.g., information items concerning the covering material used or about special fitting features of the vehicle seats 1) is attached to the side of pallet 2. These information items can be already used in order to direct preceding manufacturing sequences.

The information items stored in chip 4 are read out by means of a reading device 5 and passed on to a computer 6 which, on the basis of them, selects suitable values from previously stored treatment parameters (e.g., treatment parameters for temperature, air moisture or treatment duration) and passes the treatment parameters onto a steam generator 7 (phase A). Pallet 2 is then transported into a first treatment chamber 8 in which the contour of vehicle seats 1 is established by means of ultrasonic sensors 9. The measured values are likewise passed on to computer 6 which subsequently moves steam nozzles 10 (which can be displaced by motor) to a predetermined distance in front of vehicle seats 1. In treatment chamber 8, the treatment of the covering material by a temporary increase in its moisture content now takes place by means of the supply of a heated air/steam mixture from steam generator 7, the fibers softening by the supply of moisture (phase B). By the action of a drawing force which extends the covering material and is generated by the compression of the seat cushion and the application, which is associated therewith, of tensile stresses into the covering material, an automatic smoothing process takes place.

After the treatment time provided for the treatment of vehicle seats 1 concerned finishes, pallet 2 is conveyed further into a further treatment chamber 11 (phase C) in which the covering material and vehicle seats 1 are dried in their entirety. For this purpose, hot air is blown into treatment chamber 11 by means of a fan 12 and a heating system 13, said hot air escaping again on the opposite side of treatment chamber 11 via an outlet connection 14. Arranged in outlet connection 14 is a moisture sensor 15 which measures the moisture content of the escaping air and passes it on to a computer 16. The drying process is ended only when the measured moisture has reached a predetermined value. Pallet 2 is subsequently moved out of treatment chamber 11 (phase D). Vehicle seats 1 can now be conveyed further for installation into the associated motor vehicle.

According to an exemplary embodiment, a vehicle component (e.g., an interior fitting piece for use in a motor vehicle, etc.) is provided that is treated by any of the above described methods. The vehicle component can comprise, for example, an elastically upholstered vehicle seat and/or elastically upholstered seat add-on parts (head restraints, arm rests or the like) with an upholstered cover, but also an extensive piece of trim for the vehicle interior with a rigid support, a covering material and an upholstered layer arranged between the support and covering material, in particular a roof lining, a door or pillar trim or a dashboard.

The invention claimed is:

1. A method of treating a cover material for use with an interior vehicle component, the method comprising:
   placing a cover material into a treatment chamber for moistening;
   moistening the cover material in the treatment chamber to soften the cover material; and
   smoothing the cover material by providing a drawing force that extends the cover material, wherein the drawing force is produced by depositing the cover material onto an elastically compressible base of the interior vehicle component,
   wherein the moisture content of the cover material after moistening in the treatment chamber is between approximately 2 percent and 10 percent by weight.

2. The method of claim 1, wherein the moisture content of the cover material after moistening in the treatment chamber is approximately 5 percent.

3. A method of treating a cover material for use with an interior vehicle component, the method comprising:
   placing a cover material into a treatment chamber for moistening;
   moistening the cover material in the treatment chamber to soften the cover material; and
   smoothing the cover material by providing a drawing force that extends the cover material, wherein the drawing force is produced by depositing the cover material onto an elastically compressible base of the interior vehicle component,
   wherein the step of moistening the cover material in the treatment chamber comprises providing the treatment chamber at an air temperature of between approximately 100 degrees Celsius and approximately 150 degrees Celsius.

4. The method of claim 3, wherein the step of moistening the cover material in the treatment chamber comprises providing the treatment chamber at an air temperature of between approximately 125 degrees Celsius and approximately 130 degrees Celsius.

5. A method of treating a cover material for use with an interior vehicle component, the method comprising:
   placing a cover material into a treatment chamber for moistening;
   moistening the cover material in the treatment chamber to soften the cover material, the step of moistening the cover material in the treatment chamber comprising supplying steam to the treatment chamber;
   smoothing the cover material by providing a drawing force that extends the cover material, wherein the drawing force is produced by depositing the cover material onto an elastically compressible base of the interior vehicle component; and
   providing an additive to the steam.

6. The method of claim 5, wherein the additive comprising at least one of an particularly odorous substance, a smoothing agent, and a stain-inhibiting agent.

7. A method of treating a cover material for use with an interior vehicle component, the method comprising:
   placing a cover material into a treatment chamber for moistening;
   moistening the cover material in the treatment chamber to soften the cover material;
   smoothing the cover material by providing a drawing force that extends the cover material, wherein the drawing force is produced by depositing the cover material onto an elastically compressible base of the interior vehicle component; and
   at least partially drying the cover material after the moistening.

8. The method of claim 7, further comprising the steps of measuring the moisture content of the cover material, and continuing moistening until a predetermined moisture content is reached.

9. The method of claim 8, further comprising the step of directly measuring the moisture content of the cover material.

10. The method of claim 7, wherein the step of moistening the cover material in the treatment chamber comprises supplying steam to the treatment chamber.

11. The method of claim 7, wherein the step of moistening the cover material in the treatment chamber is done after depositing the cover material onto the elastically compressible base.

12. The method of claim 7, wherein the step of moistening the cover material in the treatment chamber is done subsequent to depositing the cover material on the elastically compressible base with elastic compression of the base.

13. The method of claim 7, wherein the moisture content of the cover material after drying is less than approximately 1.0 percent by weight.

14. The method of claim 13, wherein the moisture content of the cover material after drying is between approximately 0.05 percent and approximately 0.25 percent by weight.

15. The method of claim 14, wherein the step of at least partially drying the cover material comprises at least partially drying the cover material in the same treatment chamber as the moistening.

16. The method of claim 14, wherein the step of at least partially drying the cover material comprises at least partially drying the cover material outside the treatment chamber for moistening.

17. The method of claim 16, wherein the step of at least partially drying the cover material comprises at least partially drying the cover material in a second treatment chamber following the treatment chamber for moistening.

18. The method of claim 14, further comprising the steps of measuring the moisture content of cover material and drying the cover material until a predetermined moisture content is reached.

19. The method of claim 18, further comprising the step of directly measuring the moisture content of the cover material.

20. A method of treating a cover material for use with an interior vehicle component, the method comprising:
   placing a cover material into a treatment chamber for moistening;
   moistening the cover material in the treatment chamber to soften the cover material;
   smoothing the cover material by providing a drawing force that extends the cover material, wherein the drawing force is produced by depositing the cover material onto an elastically compressible base of the interior vehicle component;
   grouping together a plurality cover materials supported by an auxiliary transportation device; and
   supplying the plurality of cover materials to the treatment chamber for moistening.

21. A method of treating a cover material for use with an interior vehicle component, the method comprising:
placing a cover material into a treatment chamber for moistening;
moistening the cover material in the treatment chamber to soften the cover material;
smoothing the cover material by providing a drawing force that extends the cover material, wherein the drawing force is produced by depositing the cover material onto an elastically compressible base of the interior vehicle component; and
subjecting the cover material in the treatment chamber to mechanical processing employing at least one of brushes and rollers.

22. A method of treating a cover material for use with an interior vehicle component, the method comprising:
placing a cover material into a treatment chamber for moistening;
moistening the cover material in the treatment chamber to soften the cover material;
smoothing the cover material by providing a drawing force that extends the cover material; and
measuring the moisture content of the cover material, and continuing moistening until a predetermined moisture content is reached.

23. The method of claim 22, further comprising the step of directly measuring the moisture content of the cover material.

24. The method of claim 22, further comprising the step of at least partially drying the cover material after the moistening.

25. The method of claim 24, further comprising the step of drying the cover material until a predetermined moisture content is reached.

26. A method of treating a cover material for use with an interior vehicle component, the method comprising:
placing a cover material into a treatment chamber for moistening;
moistening the cover material in the treatment chamber to soften the cover material;
smoothing the cover material by providing a drawing force that extends the cover material; and
at least partially drying the cover material after the moistening in a second treatment chamber following the treatment chamber for moistening that is outside the treatment chamber for moistening.

27. The method of claim 7, wherein the elastically compressible base is formed of a foam material.

28. The method of claim 7, wherein the elastically compressible base is a seat cushion.

* * * * *